F. W. WITTE.
BALL BEARING.
APPLICATION FILED APR. 23, 1906.
900,634.
Patented Oct. 6, 1908.
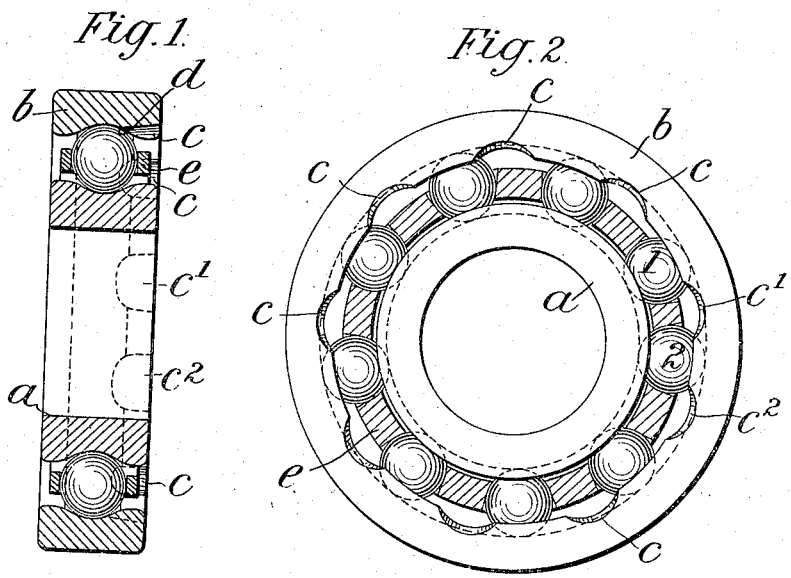

BEST AVAILABLE COPY

UNITED STATES PATENT OFFICE.

FREDERICK WILLIAM WITTE, OF CHELMSFORD, ENGLAND.

BALL-BEARING.

No. 900,634.    Specification of Letters Patent.    Patented Oct. 6, 1908.

Application filed April 23, 1906.   Serial No. 313,254.

*To all whom it may concern:*

Be it known that I, FREDERICK WILLIAM WITTE, a citizen of the United States, residing at Chelmsford, in the county of Essex, England, have invented a certain new and useful Improvement in Ball-Bearings, of which the following is a specification.

This invention relates to ball bearings of the self contained, single row, two point type, in which the balls travel in two tracks of equal depth and approximately of the same curvature as the balls and of which many forms are in use or have been proposed, one form consisting of two rings having unbroken sides between which as many balls are placed as can be got in by placing the rings eccentrically and then spacing the balls apart, a construction which would be entirely satisfactory if the number of balls could be increased and the load thus better supported.

The object of the present invention is to provide a bearing which possesses the advantage of carrying the full number of balls less the space occupied by the spacing device or cage where such is used and in which an arrangement heretofore proposed is adopted, of having a gap in the side of one of the rings for each ball, so that the filling is quickly performed, the principal object of the present invention being to so space the balls apart by the cage or holding device employed and to so space the gaps in the ring that only once in the entire revolution of the balls will they come opposite to their entering gaps whereby their liability to be forced out by any lateral pressure will be reduced.

In the accompanying drawings:—Figure 1 is a cross section of a form of bearing, and Fig. 2 is a face view but with the ball cage in section.

It will be seen that the inner ring $a$ and the outer ring $b$ have the usual curved tracks for the balls and that from one side of one of these rings, in this case the ring $b$, (or less desirably the ring $a$) there is formed a gap or groove $c$ for each ball said gap preferably not passing directly into the track or being of the full depth of the latter but leaving an abutment $d$ which is sufficient to maintain the track perfect at the working point of contact of the balls.

In the arrangement shown, two of the balls 1 and 2 are carried by the cage $e$ closer together than the rest and there are two gaps $c'$ $c^2$ which are also closer together and which are adapted to receive such balls 1 and 2.

To assemble the bearing, the balls, either with or without the cage are arranged around the track of say the inner ring $a$ so that a ball is opposite each gap $c$ $c'$ $c^2$ and the inner ring with the balls in the bottom of its curved track are then forced into the other by reason of the balls moving through the gaps and riding over the abutment $d$ by pressure and the slight elasticity of the ring $b$, which owing to the grooves or cuts being all around same can expand equally and thus has less strain thrown upon it than in those well known forms of bearings in which the last balls are entered through a single gap or gaps by pressure, a construction which necessitates where only one gap in the outer ring is employed, a gap deeper than its track which is thus cut into or where a gap is formed in each ring the weakening of the inner which it is of importance in bearings of this class to avoid it being already more liable to fracture than the outer.

It will be understood that in the present invention the balls cannot be inserted if both rings occupy the same plane but only when such balls are in the track of the inner and when such track lies opposite the gaps of the outer as it does before the inner ring is passed into the latter. When the two rings and balls are in position it will be seen that it is only at points opposite the gaps that the minimum depth of abutment as $d$ exists, the parts between the grooves being abutments of the full size formed by the usual walls of the track.

With the arrangement illustrated, only once in an entire rotation of the balls around their track will the whole of them be opposite to points where they were entered and where an excess of lateral pressure greater than that which the abutment $d$ can withstand will effect damage, such point being that when the balls 1 2 come opposite the gaps $c'$ $c^2$.

In the drawings the balls and cage are shown as having made a partial rotation for the purpose of better disclosing the gaps. The gaps preferably incline or taper down from the outside to the track as shown.

The present invention differs from those heretofore known having a single gap or opening either in one ring or in both rings communicating with the track, as in the latter case, the method of assembling being to put the last few balls in singly through the gaps after the rings were concentric or in the same plane while in the present case the balls are all put in together by first placing them in the depth of the track of one ring and then forcing them through the gaps over a slight abutment into the track of the other ring by which means an unbroken track with the advantage consequent to this type is secured.

The cage may be of the solid type, the balls being placed therein before they are forced down the gaps or it may be divided and be placed over the balls after they are in position.

I have stated that there is a separate gap for each ball and this is preferable but it would come within the present invention if one or more of the grooves were made large enough to pass two or more balls at the same time so long as the irregular spacing is adhered to.

What I claim is:—

1. A ball bearing comprising balls, a spacing device for the same adapted to unequally space the balls, an inner and an outer ring, each having a curved track, and having a gap for each ball in one of the rings only, passing from one side inwardly toward the track.

2. A ball bearing comprising balls, a spacing device for the same adapted to unequally space the balls, an inner and an outer ring, each having a curved track, and having a series of gaps in one of the rings unequally spaced around the same to correspond with the spacing of the balls, such gaps passing from one side inwardly toward the track.

3. A ball bearing comprising balls, a spacing device for the same adapted to unequally space the balls, an inner and an outer ring, each having a curved track and having a series of gaps in one of the rings unequally spaced around the same to correspond with the spacing of the balls, such gaps being of a depth where they enter the track which is less than the full depth of such track.

In testimony whereof I have hereunto set my hand in the presence of two subscribing witnesses.

FREDERICK WILLIAM WITTE.

Witnesses:
H. D. JAMESON,
A. NUTTING.